United States Patent
Cobianco et al.

(10) Patent No.: US 6,499,539 B1
(45) Date of Patent: Dec. 31, 2002

(54) PROCESS FOR REDUCING THE ADSORPTION OF POLYMERS ONTO ROCK MATRIX

(75) Inventors: Sandra Cobianco, Fara Gera d'Adda (IT); Thomas Paul Lockhart, Lodi (IT); Alessandro Lezzi, Milan (IT); Alberto Guarneri, Casalbuttano (IT)

(73) Assignees: ENI S.p.A., Rome (IT); Enitechnologie S.p.A., San Donato Milanese (IT)

( * ) Notice: Subject to any disclaimer, the term of this patent is extended or adjusted under 35 U.S.C. 154(b) by 4 days.

(21) Appl. No.: 09/721,653

(22) Filed: Nov. 27, 2000

(30) Foreign Application Priority Data

Nov. 26, 1999 (IT) .......................... MI99A2477

(51) Int. Cl.⁷ .......................... E21B 33/10; E21B 43/00
(52) U.S. Cl. ..................... 166/305.1; 166/285
(58) Field of Search .............................. 166/305.1, 285, 166/278, 307, 308

(56) References Cited

U.S. PATENT DOCUMENTS

| | | | |
|---|---|---|---|
| 4,005,749 A | * 2/1977 | Birk et al. | |
| 4,609,478 A | * 9/1986 | Egan | |
| 5,363,915 A | * 11/1994 | Marquis et al. | 166/274 |
| 5,529,122 A | * 6/1996 | Thach | 166/281 |
| 5,710,107 A | * 1/1998 | Walker | 507/110 |
| 5,977,032 A | 11/1999 | Chan | |
| 6,122,860 A | 9/2000 | Tapavicza et al. | |

FOREIGN PATENT DOCUMENTS

| | | |
|---|---|---|
| WO | WO 92/02594 | 2/1992 |
| WO | WO 97/19145 | 5/1997 |
| WO | WO 98/18882 | 5/1998 |

\* cited by examiner

*Primary Examiner*—David Bagnell
*Assistant Examiner*—Jennifer Dougherty
(74) *Attorney, Agent, or Firm*—Oblon, Spivak, McClelland, Maier & Neustadt, P.C.

(57) ABSTRACT

Process for reducing the adsorption of hydrosoluble polymers onto rock matrix, which comprises putting the rock matrix in contact with an aqueous solution of polymers containing sacrificial agents, preferably selected from ionic and non-ionic oligomeric surface-active agents. In the preferred embodiment the surface-active agents are non-ionic.

14 Claims, No Drawings

PROCESS FOR REDUCING THE ADSORPTION OF POLYMERS ONTO ROCK MATRIX

The present invention relates to a process for reducing the adsorption onto rock material of polymers present in fluids used in drilling, completion and fracturing operations of oil and/or gas wells.

Water-based drilling, fracturing and completion fluids (in particular fluids for gravel packing) used in the treatment of reservoirs formations, often contain hydrosoluble polymers.

These polymers may be either synthetic (for example polyacrylamides) or natural; in this case the polymers are known as biopolymers. Typical examples of the latter (mostly of the polysaccharide or cellulose type) are scleroglucan, xanthan gum, guar gum, hydroxypropyl guars, welan gum, galactomannans and hydrophobically modified galactomannans, succinoglucan, celluloses variously modified with hydrophobic chains, hydroxyethyl celluloses or their mixtures.

These polymers are used to obtain the viscosities required in relation to the performances desired. For example, in the case of drilling fluids, the presence of these polymers improves the suspending and transport properties of the fluid; as a secondary effect, the filtrating properties of the fluid are also improved, thus reducing the quantity of filtrate which can invade the reservoir.

During the optimizization of the various fluids used in the drilling, fracturing and completion of oil and/or gas wells, it has been demonstrated however that these polymers have the disadvantage of being strongly adsorbed on rock formations.

This adsorption probably causes a reduction in the well productivity, as it modifies the permeability of the reservoirs, seriously damaging them.

In fact, when a biopolymer solution (for example a scleroglucan) is injected into a porous medium, for example sandstone core of the Clashach type, mainly consisting of quartz (98%) and a small percentage of clays (2%), the polymer is adsorbed onto the rock and remains almost totally adsorbed even after displacement with an aqueous solution of KCl 3%. The effect of this adsorption can be seen comparing the permeability of the porous medium before the polymer injection and after its displacement with the aqueous solution of KCl 3%. A comparison between the initial permeability to water of the porous medium ($k_i$) and the final permeability ($k_f$), i.e. after displacement of the polymer with a solution of KCl 3%, shows a drastic decrease in the permeability to water due to the adsorbed polymer.

A process has now been found for at least partly reducing the drawbacks relating to the adsorption of polymers onto rock matrix.

In accordance with this, the present invention relates to a process for reducing the adsorption of hydrosoluble polymers onto rock matrix, which comprises putting the rock matrix in contact with an aqueous solution of polymers comprising sacrificial agents, preferably selected from ionic and non-ionic oligomeric surface-active agents.

The hydrosoluble polymers are selected from biopolymers and synthetic polymers. Typical examples of these polymers are indicated above.

The term "oligomeric surface-active agents" refers to surface-active agents having a molecular weight ranging from 150 to 5000, preferably from 200 to 2000. They are selected from cationic, anionic, amphoteric, non-ionic surface-active agents.

In the preferred embodiment, the oligomeric surface-active agents are of a non-ionic nature with an HLB ranging from 11 to 16, and their concentration varies from 0.5 g/l to 20.0 g/l, preferably from 2.0 to 10.0 g/l.

Typical examples of non-ionic surface-active agents which can be used in the process of the present invention are those belonging to the group of alkylpolyglucosides. The latter are selected from those having general formula (I)

$$R\text{—}O\text{—}(A\text{—}O)x\text{-}(G)y\text{-}(D)z \qquad (I)$$

wherein:

R is a non-substituted or hydroxy-substituted, linear or branched $C_8$–$C_{26}$ alkyl group;

A is a linear or branched $C_2$–$C_4$ alkylene group, or a bifunctional residue of a polyalcohol after the removal of 2 carboxyl groups on 2 carbon atoms;

G is a saccharide residue which remains after the removal of z hydrogen atoms from all the non-glucosidic hydroxyl groups and the removal of the glucosidic hydroxyl group of a hexose/pentose reducing sugar bound to A—O or R—O (wherein x=0) by means of an O-glycosidic bond;

D is an acyl residue of an organic acid, bound to an oxygen atom of the residue (G)y having the formula: —C(=O)M wherein M is a linear or branched $C_1$–$C_{18}$ alkyl or alkenyl group, non-substituted or substituted with —OH;

x=0–10 is the condensation degree of A;

y=0–10 is the average esterification or etherification degree (G)y.

Typical examples of alkylpolyglucosides having general formula (I) are:

APG® 325 Glycoside, alkylpolysaccharide ether with HLB=13.0, MW=420 and alkyl=$C_{9/11}$ (Henkel);

APG® 600 Glycoside, alkylpolysaccharide ether with HLB=11.5, MW=420 and alkyl=$C_{12/14}$ (Henkel);

APG® 625 Glycoside, alkylpolysaccharide ether with HLB=12.0, MW=455 and alkyl=$C_{12/14}$ (Henkel);

Glucopon® 225; HLB=13.6; alkyl $C_{8/12}$ (Henkel);

Glucopon® 600; HLB=11.6; alkyl $C_{12/16}$ (Henkel);

Glucopon® 625; HLB=12.1; alkyl $C_{12/16}$ (Henkel);

The process of the present invention comprises injection of the fluid prepared according to the following procedure: the hydrosoluble polymer is dissolved in $H_2O$ or aqueous solutions of NaCl, KCl, $CaCl_2$, using a stirrer (for example of the Silverson type), the surface-active agent is then added, which, as a result of its physico-chemical characteristics, also favours the dispersion of possible other fluid additives, such as starches and celluloses used as filtrate reducers. The fluid thus prepared is used in the well, according to specific operative procedures for the various drilling, fracturing and completion fluids.

The process of the present invention is most widely applied in the oil upstream field, with particular reference to all drilling and completion operations of oil and/or gas wells involving the use of polymers, and where the prevention of the formation damage is of fundamental importance for avoiding reduction in the well productivity. The process of the present invention can therefore help to prevent formation damage during the drilling (drilling fluids), fracturing (fracturing fluids), completion (fluids for gravel packing, for example) phases.

The process of the present invention can also be applied for reducing the adsorption of hydrosoluble polymers onto any inorganic material, not only onto rock matrixes.

Furthermore, in another embodiment, the process of the present invention can be carried out in two steps: in the first phase, an aqueous solution of sacrificial agent, with a concentration of 2 to 100 g/l, preferably from 5 to 20 g/l, is injected into the rock matrix; in the second phase, the fluid containing the polymer is injected into the well adopting the procedures of the different operations (drilling, fracturing, completion).

The following examples provide a better understanding of the present invention.

EXAMPLES

Test for Evaluating the Permeability Variation of a Porous Medium

The evaluation of the permeability modification of a porous medium due to the injection of polymers and/or surface-active agents is performed by means of an experimental apparatus which allows the flooding of fluids into a porous medium (rock core). The system consists of a Hassler cell pressurized with water in which a rock core having a diameter of 5.08 cm and a length of 7.3 cm contained in a rubber sleeve, is inserted. The first phase of the test consists in the saturation under vacuum of the porous medium with an aqueous solution of KCl 3%, followed by the measurement of the initial water permeability of the porous medium at room temperature ($k_i$). The porous medium is then heated to the temperature selected for the polymer adsorption/desorption test. The injection of the fluid (polymer and/or surface-active agent or mixture of the two) is carried out with the use of a cylinder equipped with a floating piston and continues until the pressure measured by the transducer, situated at the inlet of the porous medium, becomes constant, whereas the quantity of fluids which have filtrated throughout the core is monitored by means of an electronic balance connected to the data acquisition system. After a shut-in phase of about 16 hours, during which the fluid injected remains confined inside the porous medium at the selected temperature, the fluid is displaced by an aqueous solution of KCl 3% until the pressure measured by the transducer remains constant. At this point, the porous medium is cooled to room temperature, the final permeability to water ($k_f$) is measured by the injection of an aqueous solution of KCl 3% and the variation in the water permeability is evaluated as a ratio between the final and initial permeability ($k_i/k_f$).

Comparative Example 1

Injection Test of an Aqueous Solution of Scleroglucan in a Clashach Sandstone Core An aqueous solution of scleroglucan prepared by dissolving 6 g of BIOVIS (scleroglucan) supplied by SKW Trostberg in 1000 ml of deionized water using a Silverson stirrer for 1 h, was injected into a Clashach core (sandstone) according to the procedure described above, at a temperature of 80° C.

The initial permeability to water is 1022 mD, the final permeability, after injection and substitution of the biopolymer, is 14 mD.

Example 2

Injection Test of an Aqueous Solution of Scleroglucan and Alkylpolyglucoside in a Clashach Sandstone Core The aqueous solution of scleroglucan and surface-active agent was prepared by dissolving 6 g of BIOVIS (scleroglucan) supplied by SKW Trostberg in 1000 ml of deionized water using a Silverson stirrer for 1 h and the subsequent addition of 5 g of an alkylpolyglucoside functionalized with $C_{14}$–$C_{15}$ alkyl chains. The solution was injected into a Clashach core (sandstone) according to the procedure described above, at a temperature of 80° C.

The initial permeability to water is 907 mD, the final permeability, after injection and displacement of the biopolymer, is 140 mD.

Comparative Example 3

Injection Test of an Aqueous Solution of Xanthan Gum in a Clashach Sandstone Core An aqueous solution of scleroglucan prepared by dissolving 6 g of N-VIS (xanthan gum) supplied by Baroid in 1000 ml of deionized water using a Silverson stirrer for 1 h, was injected into a Clashach core (sandstone) according to the procedure described above, at a temperature of 50° C.

The initial permeability to water is 822 mD, the final permeability, after injection and displacement of the biopolymer, is 219 mD.

Example 4

Injection Test of an Aqueous Solution of Xanthan Gum and Alkylpolyglucoside in a Clashach Sandstone Core The aqueous solution of xanthan gum and a surface-active agent was prepared by dissolving 6 g of N-VIS (xanthan gum) supplied by Baroid in 1000 ml of deionized water using a Silverson stirrer for 1 h and the subsequent addition of 5 g of an alkylpolyglucoside functionalized with $C_{14}$–$C_{15}$ alkyl chains. The solution was injected into a Clashach core (sandstone) according to the procedure described above, at a temperature of 50° C.

The initial permeability to water is 1490 mD, the final permeability, after injection and displacement of the biopolymer, is 1052 mD.

Comparative Example 5

Injection Test of an Aqueous Solution of Scleroglucan in a Portland Limestone Core An aqueous solution of scleroglucan prepared by dissolving 6 g of BIOVIS (scleroglucan) supplied by SKW Trostberg in 1000 ml of deionized water using a Silverson stirrer for 1 h, was injected into a Portland core (limestone) according to the procedure described above, at a temperature of 80° C.

The initial permeability to water is 27 mD, the final permeability, after injection and displacement of the biopolymer, is 15 mD.

Example 6

Injection Test of an Aqueous solution of Scleroglucan and Alkylpolyglucoside in a Portland Limestone Core The aqueous solution of scleroglucan and surface-active agent was prepared by dissolving 6 g of BIOVIS (scleroglucan) supplied by SKW Trostberg in 1000 ml of deionized water using a Silverson stirrer for 1 h and the subsequent addition of 5 g of an alkylpolyglucoside functionalized with $C_{14}$–$C_{15}$ alkyl chains. The solution was injected into a Portland core (limestone) according to the procedure described above, at a temperature of 80° C.

The initial permeability to water is 15 mD, the final permeability, after injection and displacement of the biopolymer, is 12 mD.

TABLE 1

| Fluid | EX. | Porous medium | T (° C.) | $k_i$ (mD) | $k_f$ (mD) | $k_f/k_i$ (%) |
|---|---|---|---|---|---|---|
| Scleroglucan, 6 g/l | 1 comp. | sandstone | 80 | 1022 | 14 | 1.4 |
| Scleroglucan, 6 g/l + Alkylpolyglucoside, 5 g/l | 2 | sandstone | 80 | 907 | 140 | 16 |
| Xanthan gum, 6 g/l | 3 comp. | sandstone | 50 | 822 | 219 | 27 |

TABLE 1-continued

| Fluid | EX. | Porous medium | T (° C.) | $k_i$ (mD) | $k_f$ (mD) | $k_f/k_i$ (%) |
|---|---|---|---|---|---|---|
| Xanthan gum, 6 g/l + Alkylpolyglucoside, 5 g/l | 4 | sandstone | 50 | 1490 | 1052 | 70 |
| Scleroglucan, 6 g/l | 5 comp. | limestone | 80 | 27 | 15 | 55 |
| Scleroglucan, 6 g/l + Alkylpolyglucoside, 5 g/l | 6 | limestone | 80 | 15 | 12 | 80 |

In the case of scleroglucan in the presence of a porous medium such as Clashach sandstone (98% quartz and 2% clays), comparative example 1 demonstrates that the return permeability, i.e. the ratio between the final permeability to water and the initial permeability to water, is equal to 1.4%.

When an aqueous solution of a mixture consisting of scleroglucan and a surface-active agent of the alkylpolyglucoside type is injected into the porous medium (example 2) over the critical micelle concentration (CMC), the return permeability significantly improves, passing from 1.4% to 16%.

Also in the case of a different porous medium (Portland limestone, comparative example 5 and example 6), the addition of alkylpolyglucoside improves the return permeability (from 55% to 80% respectively).

Even more brilliant results are obtained with the anionic polymer xanthan gum, whose return permeability passes (comparative example 3 and example 4) from 27% to 70%.

Example 7

A description follows of the preparation and properties of a water-based drilling fluid containing scleroglucan, starch, cellulose microfibers and alkyl polyglucosides.

Preparation of a Drilling Fluid
Preparation of a Fluid Based on Scleroglucan, Starch and Cellulose Microfibers, and Alkylpolyglucoside The formulation was prepared according to the following procedure: 6 g of Biovis® (scleroglucan) were dissolved in 1 liter of deionized water using a Silverson stirrer for 30 minutes. 5 g of APG DC145 were then added to the solution under stirring, followed by 16 g of EXSTAR® starch and 16 g of cellulose microfibers. At the end of the preparation, the fluid was brought to pH 10 with a solution of NaOH 1N, characterized from a rheological point of view by means of FANN 35, according to the API B-13 procedures of September 1997 and subsequently subjected to filtration tests under static conditions according to the following procedure.

200 ml of fluid were introduced into an API modified filtration cell, in which the filter paper was substituted with an aloxite disk having a thickness of 0.5 cm, a diameter of 5.08 cm, a permeability of 750 mD and a porosity of 5 μm. A pressure of 7 bars was then applied to the cell and the filtrate recovered after 10 minutes was measured.

The evaluation of the thermal stability of the formulation was done by comparing the rheological data before (BHR) and after (AHR) heating to 90° C. for 16 h and 17 rpm (hot rolling test). The data are provided in Table 2.

TABLE 2

Formulation composition for a drilling fluid

| Components | |
|---|---|
| Water, ml | 1000 |
| Scleroglucan, g | 6 |
| Starch (Exstar), g | 16 |
| Colloidal cellulose microfibers (N-VIS HB), g | 16 |
| APG DC145, g | 5 |
| Density, g/cm$^3$ | 1.06 |
| pH | 10.2 |

Rheological characteristics

| | BHR | AHR 90° C., 16 h |
|---|---|---|
| Reading at 600 rpm, Pa | 44 | 53 |
| Reading at 300 rpm, Pa | 35 | 38 |
| Reading at 200 rpm, Pa | 29 | 32 |
| Reading at 100 rpm, Pa | 23 | 25 |
| Reading at 6 rpm, Pa | 12 | 12 |
| Reading at 3 rpm, Pa | 11 | 11 |
| Gel 10"/10' g/100 cm$^2$ | 7/8.5 | 8/11 |
| PV, cP | 11 | 15 |
| YP, g/100 cm$^2$ | 11 | 11.5 |
| $\tau_o$, k, n (Herschel-Burckley model parameters) | 4.12 0.65 0.48 | 4.61 0.40 0.58 |
| Filtrate (10', 750 mD), ml | | 4.02 |

Damage Formation test

| Porous medium | T (° C.) | $k_i$ (mD) | $k_f$ (mD) | $k_f/k_i$ (%) |
|---|---|---|---|---|
| Limestone | 80 | 12.3 | 12.9 | 100 |

The data of Table 2 show that the rock matrix is not damaged after treatment with the drilling fluid containing the polymer and surface-active agent.

What is claimed is:

1. A process for reducing the adsorption of hydrosoluble polymers onto a rock matrix, which comprises putting the rock matrix in contact with an aqueous solution of one or more polymers comprising a sacrificial agent, wherein the sacrificial agent is selected from the group consisting of non-ionic oligomeric surface-active agents having a molecular weight ranging from 150 to 5000.

2. A process according to claim 1 wherein the non-ionic oligomeric surface-active agents have a molecular weight ranging from 200 to 2000.

3. A process according to claim 1, wherein the non-ionic oligomeric surface-active agents are selected from alkylpolyglucosides.

4. A process according to claim 3, wherein said alkylpolyglucosides have the formula (I)

$$R\text{—}O\text{—}(A\text{—}O)_x\text{—}(G)_y\text{—}(D)_z \qquad (I)$$

wherein:
R is a non-substituted or hydroxy-substituted, linear or branched $C_8$–$C_{26}$ alkyl group;
A is a linear or branched $C_2$–$C_4$ alkylene group, or a bifunctional residue of a polyalcohol after the removal of 2 carboxyl groups on 2 carbon atoms;
G is a saccharide residue which remains after the removal of z hydrogen atoms from all the non-glucosidic hydroxyl groups and the removal of all glucosidic hydroxyl groups of a hexose/pentose reducing sugar bound to A—O or R—O (wherein x=0) by means of an O-glycosidic bond;

D is an acyl residue of an organic acid, bound to an oxygen atom of the residue $(G)_y$ having the formula: —C(=O)M wherein M is a linear or branched $C_1$–$C_{18}$ alkyl or alkenyl group, non-substituted or substituted with —OH;

x=0–10 is the condensation degree of A; and y=0–10 is the average esterification or etherification degree $(G)_y$.

5. A process according to claim 1, wherein the non-ionic oligomeric surface-active agents have an HLB ranging from 11 to 16.

6. A process according to claim 1, wherein the non-ionic oligomeric surface-active agents have a concentration from 0.5 g/l to 20.0 g/l.

7. A process according to claim 1, wherein the non-ionic oligomeric surface-active agents have a concentration from 2.0 g/l to 10.0 g/l.

8. A process for reducing the adsorption of hydrosoluble polymers onto a rock matrix, wherein the rock matrix is first treated with an aqueous solution of one or more non-ionic oligomeric surface-active agents having a molecular weight ranging from 150 to 5000 and subsequently with an aqueous solution comprising one or more polymers.

9. A process according to claim 8 wherein the non-ionic oligomeric surface-active agents have a molecular weight ranging from 200 to 2000.

10. A process according to claim 8, wherein the non-ionic oligomeric surface-active agents are selected from alkylpolyglucosides.

11. A process according to claim 10, wherein said alkylpolyglucosides have the formula (I)

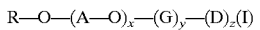

wherein:

R is a non-substituted or hydroxy-substituted, linear or branched $C_8$–$C_{26}$ alkyl group;

A is a linear or branched $C_2$–$C_4$ alkylene group, or a bifunctional residue of a polyalcohol after the removal of 2 carboxyl groups on 2 carbon atoms;

G is a saccharide residue which remains after the removal of z hydrogen atoms from all the non-glucosidic hydroxyl groups and the removal of all glucosidic hydroxyl groups of a hexose/pentose reducing sugar bound to A—O or R—O (wherein x=0) by means of an O-glycosidic bond;

D is an acyl residue of an organic acid, bound to an oxygen atom of the residue $(G)_y$ having the formula: —C(=O)M wherein M is a linear or branched $C_1$–$C_{18}$ alkyl or alkenyl group, non-substituted or substituted with —OH;

x=0–10 is the condensation degree of A; and y=0–10 is the average esterification or etherification degree $(G)_y$.

12. A process according to claim 8, wherein the non-ionic oligomeric surface-active agents have an HLB ranging from 11 to 16.

13. A process according to claim 8, wherein the non-ionic oligomeric surface-active agents have a concentration from 0.5 g/l to 20.0 g/l.

14. A process according to claim 8, wherein the non-ionic oligomeric surface-active agents have a concentration from 2.0 g/l to 10.0 g/l.

* * * * *

UNITED STATES PATENT AND TRADEMARK OFFICE
CERTIFICATE OF CORRECTION

PATENT NO. : 6,499,539 B1
DATED : December 31, 2002
INVENTOR(S) : Cobianco et al.

Page 1 of 1

It is certified that error appears in the above-identified patent and that said Letters Patent is hereby corrected as shown below:

<u>Title page,</u>
Item [73], the Assignee information is incorrect. It should read:

-- [73] Assignees: ENI S.p.A., Rome (IT); Enitecnologie S.p.A., San Donato Milanese (IT) --

Item [30], the Foreign Application Priority Data is incorrect. It should read:

-- [30]      Foreign Application Priority Data

Nov. 26, 1999      (IT) ……………………..MI99A002477 --

Signed and Sealed this

Tenth Day of June, 2003

JAMES E. ROGAN
*Director of the United States Patent and Trademark Office*